United States Patent
Blair et al.

(10) Patent No.: US 7,299,411 B2
(45) Date of Patent: Nov. 20, 2007

(54) PROVIDING A PRESENTATION ENGINE ADAPTED FOR USE BY A CONSTRAINED RESOURCE CLIENT DEVICE

(75) Inventors: Robert Bruce Blair, San Francisco, CA (US); Neil Carson, Redwood City, CA (US); Robert Etheredge, Orinda, CA (US); David Flynn, Sandy, UT (US); Christopher John Guerra, Dorchester (CA)

(73) Assignee: Liberate Technologies, San Carlos, CA (US)

( * ) Notice: Subject to any disclaimer, the term of this patent is extended or adjusted under 35 U.S.C. 154(b) by 164 days.

(21) Appl. No.: 10/675,918

(22) Filed: Sep. 29, 2003

(65) Prior Publication Data

US 2004/0133855 A1 Jul. 8, 2004

Related U.S. Application Data

(60) Provisional application No. 60/414,250, filed on Sep. 27, 2002.

(51) Int. Cl.
*G06F 15/00* (2006.01)
*G06F 15/16* (2006.01)

(52) U.S. Cl. .................. 715/517; 715/513; 715/522; 709/247

(58) Field of Classification Search ............... 715/517, 715/522, 501.1, 513, 511, 760; 707/101; 700/101; 709/247
See application file for complete search history.

(56) References Cited

U.S. PATENT DOCUMENTS

| | | | |
|---|---|---|---|
| 6,023,714 A * | 2/2000 | Hill et al. ................ | 715/513 |
| 6,226,642 B1 * | 5/2001 | Beranek et al. ............ | 707/10 |
| 6,580,438 B1 * | 6/2003 | Ichimura et al. ........... | 715/732 |
| 6,589,291 B1 * | 7/2003 | Boag et al. ................ | 715/513 |
| 6,671,853 B1 * | 12/2003 | Burkett et al. ............. | 715/513 |
| 7,007,105 B1 * | 2/2006 | Sullivan et al. ............ | 709/247 |
| 2001/0042081 A1 * | 11/2001 | Macfarlane et al. ........ | 707/513 |
| 2001/0044809 A1 * | 11/2001 | Parasine et al. ............ | 707/513 |
| 2003/0023628 A1 * | 1/2003 | Girardot et al. ............ | 707/513 |
| 2003/0028805 A1 * | 2/2003 | Lahteenmaki .............. | 709/229 |
| 2003/0046317 A1 * | 3/2003 | Cseri et al. ................ | 707/513 |
| 2005/0027823 A1 * | 2/2005 | Rana ........................ | 709/219 |
| 2005/0193372 A1 * | 9/2005 | Wu et al. ................... | 717/118 |

OTHER PUBLICATIONS

David Flanagan, "JavaScript: The Definitive Guide", pp. 1-6, published Dec. 3, 2001.*

* cited by examiner

*Primary Examiner*—Thu V. Huynh
(74) *Attorney, Agent, or Firm*—Synnestvedt & Lechner LLP (57) ABSTRACT

A transcoder that converts text-based computer software instructions or code intended for use by a presentation engine into a binary code adapted for use by a constrained function presentation engine.

7 Claims, 5 Drawing Sheets

FIG. 5

PROVIDING A PRESENTATION ENGINE ADAPTED FOR USE BY A CONSTRAINED RESOURCE CLIENT DEVICE

CROSS-REFERENCE TO RELATED APPLICATIONS

This patent application claims the benefit of U.S. Provisional Patent Application Ser. No. 60/414,250, filed on Sep. 27, 2002, for SYSTEM AND METHOD OF PROVIDING A PRESENTATION ENGINE ON A CLIENT DEVICE, which is incorporated herein by reference in its entirety.

BACKGROUND OF THE INVENTION

1. Field of the Invention

This invention relates generally to transcoding or adapting information for use by a constrained presentation engine in a client device operating in an information distribution system.

2. Description of the Related Art

Interactive television services are increasingly becoming available on many cable and satellite distribution networks. In such networks, television programming and other multimedia content is delivered to and processed by a set top box located at a subscriber's premises. In addition to conventional television programming, interactive services are also being made available to network subscribers. Such services may include the delivery of applications such as games, weather, email, tickers, TV chat and walled garden web type content.

In some interactive networks, a presentation engine resides on a set top box that can be used by various interactive applications or services to provide a user interface and to provide a user with requested information. In some cases, a presentation engine handles HTML-based interactive content that is to be displayed on a TV set. A Presentation Engine (PE) is, in some embodiments, similar to a Web browser in that it provides support for creating and using the Web's standardized mark-up and scripting languages, such as Hypertext Mark-up Language (HTML) and ECMAScript. Unfortunately, the implementation of a presentation engine on a set top box requires a relatively large amount of computing resources, including memory and processing cycles.

SUMMARY OF THE INVENTION

In accordance with one illustrative embodiment of the invention, a transcoder is provided that converts text-based computer software instructions or code (such as XML or CSS) intended for use by a conventional presentation engine into binary code adapted for use by a constrained feature presentation engine.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following embodiments of the present invention will be described within the context of an information distribution system adapted to distribute information streams (e.g., video streams, audio streams and the like), data files (email, computer files and the like) and general control information, although those skilled in the art will recognize that the disclosed methods and structures are readily adaptable for broader application.

In one embodiment, extensible mark-up language (XML) information streams and/or data files intended for use by one or more client devices are converted or transcoded by a near side server into feature or function reduced information streams and/or data files which are subsequently propagated to the client. The conversion/transcoding operates to shift a portion of the processing burden associated with the use of the information streams and/or data files from the client device(s) to the near side server, thereby enabling the use of so-called thin client devices (i.e., client devices such as set top boxes having a relatively limited memory or processing power). In general, the invention converts unresolved styles into resolved styles such that the processing burden placed upon the client device is lessened.

This advantageously enables the use of a constrained resource or compact presentation engine in a set top box. Other advantages include, in various embodiments, the separation of application code from presentation code; higher performance than the current Java-drawing solutions; simplified application development; the ability to implement various applications such as electronic program guides (EPGs) and API-compatibility with existing platforms if desired. It is noted that the pre-processing and compression imparted to a file being processed by the server results in a smaller file such that a smaller amount of bandwidth is utilized in transmitting the pre-processed file to the client. Moreover, as discussed in more detail below, the pre-processed file as propagated to the client is a substantially error-free file which enables the use of a non-validating parser at the client.

Moreover, writing content or applications for a digital television (DTV) platform using, for example, Java, can be a relatively difficult task for content developers, who tend to be non-programmers. The invention provides a straightforward way to enable the programming of a user interface (UI) or other presentation function using, for example, a subset of Cascading Style Sheets (CSS) and HTML. Thus, a high proportion of the functionality (i.e., that portion associated with the UI and other display functions) necessary to implement an application is provided to the content programmer such that the content programmer may primarily focus on the particular application.

Figure 1:
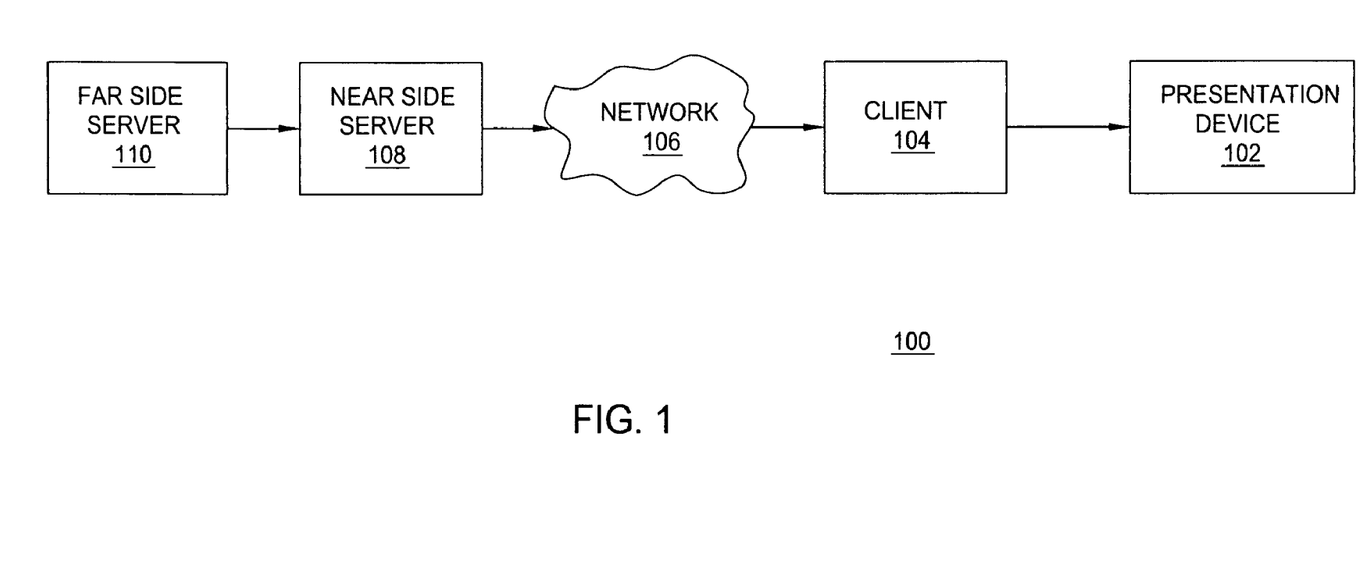
FIG. 1 depicts a high-level block diagram of an information distribution system suitable for use with the present invention.

FIG. 1 depicts a high-level block diagram of an information distribution system suitable for use with the present invention. A client computer or set top box (STB) 104 is connected to a presentation device 102 such as a television or other audiovisual display device or component(s). The connection between client computer 104 and presentation device 102 allows client computer 104 to tune and/or provide a presentation signal (e.g., a television signal) to presentation device 102.

Client 104 is also connected to a communication system 106. In one embodiment, communication system 106 includes a telephone network and the Internet. In other embodiments, communication system 106 could include a network, the Internet without a telephone network, a dedicated communication system, a cable or satellite network, a single connection to another computer or any other means for communicating with another electronic entity. In one embodiment of the invention, the client comprises an STB such as the model DCT2000 manufactured by Motorola Corporation of Schaumburg, Ill. For purposes of this description, it will be assumed that the client or STB 104 comprises a device having a relatively limited amount of memory and/or processing power compared to a full featured (e.g., desktop) computer.

Figure 2:
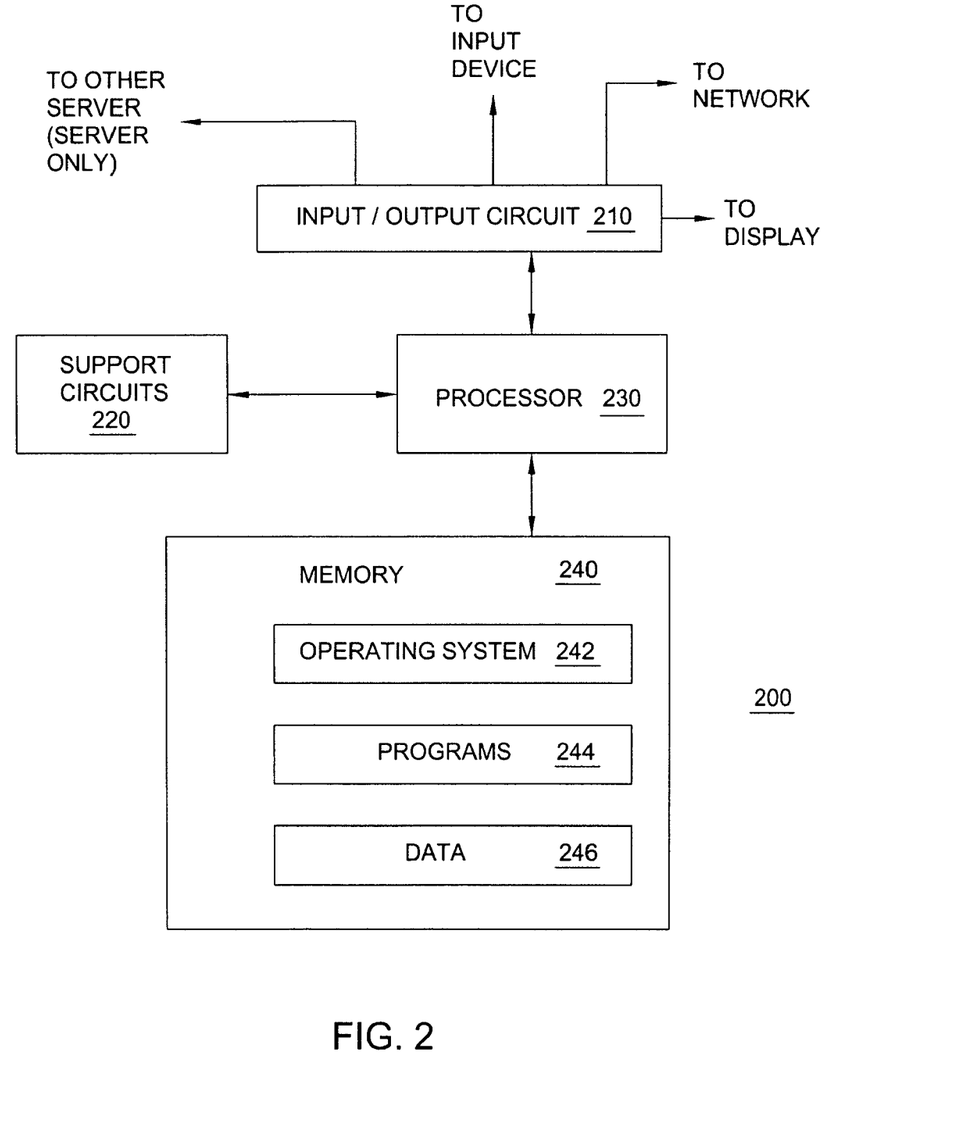
FIG. 2 depicts a high-level block diagram of a controller suitable for use in the signal analysis system of FIG. 1.

The communication system 106 is also connected to a near side server 108, such as a Unix or Windows server computer. In one embodiment, there are many near side servers connected to communication system 106. The near side servers may be situated so that there is one near side server for a predetermined number of clients. This can be accomplished by locating at least one near side server in each of a given number of geographical locations. All the near side servers are connected to far side server 110. There may be fewer far side servers (e.g., one far side server for an entire country or region of a country). Although the present invention is discussed with respect to one or more near side servers 108 and a single far side server 110, the present invention can be implemented with more or fewer near side and far side servers FIG. 2 depicts a high level block diagram of a controller topology suitable for use in the information distribution system of FIG. 1. Specifically, the controller 200 of FIG. 2 may be employed to implement relevant functions within the client 104, near side server 108 and/or far side server 110.

The controller 200 of FIG. 2 comprises a processor 230 as well as memory 240 for storing various control programs and other programs 244 and data 246. The memory 240 may also store an operating system 242 supporting the programs 244.

The processor 230 cooperates with conventional support circuitry such as power supplies, clock circuits, cache memory and the like as well as circuits that assist in executing the software routines stored in the memory 240. As such, it is contemplated that some of the steps discussed herein as software processes may be implemented within hardware, for example as circuitry that cooperates with the processor 230 to perform various steps. The controller 200 also contains input/output (I/O) circuitry 210 that forms an interface between the various functional elements communicating with the controller 200. Although the controller 200 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The controller 200 of FIG. 2 may be operably coupled to a number of devices or systems. For example, the I/O circuit 210 in FIG. 2 is depicted as interfacing to an input device (e.g., a keyboard, mouse, remote control and the like), a network (e.g., communications system 106), a display device (e.g., presentation device 102 or a display device associated with a server) and, optionally, another server (in the case of controller 200 implementing server functions).

In the case of controller 200 being used to implement a client or set top box, it will be assumed that the client or set top box comprises a device having a relatively limited amount of memory and processing power compared to a full featured desktop computer, laptop computer or server (though the client or STB may be implemented using a desktop computer, laptop computer, server or other general purpose or special purpose computer).

In the case of the controller 200 being used to implement functions within the client 104, the operating system 242 comprises, illustratively, the Mentor VRTX Real-Time Operating System (RTOS) and the programs 244 include a constrained function presentation engine, a Java application core, a Document Object Model (DOM) API and the like. Briefly, a Document Object Model parser reads an XML document and converts it into a tree of nodes that represent the full content of the document. Once a tree representation is created, a program can examine and manipulate the tree representation (and, therefore, the document).

Figure 3:
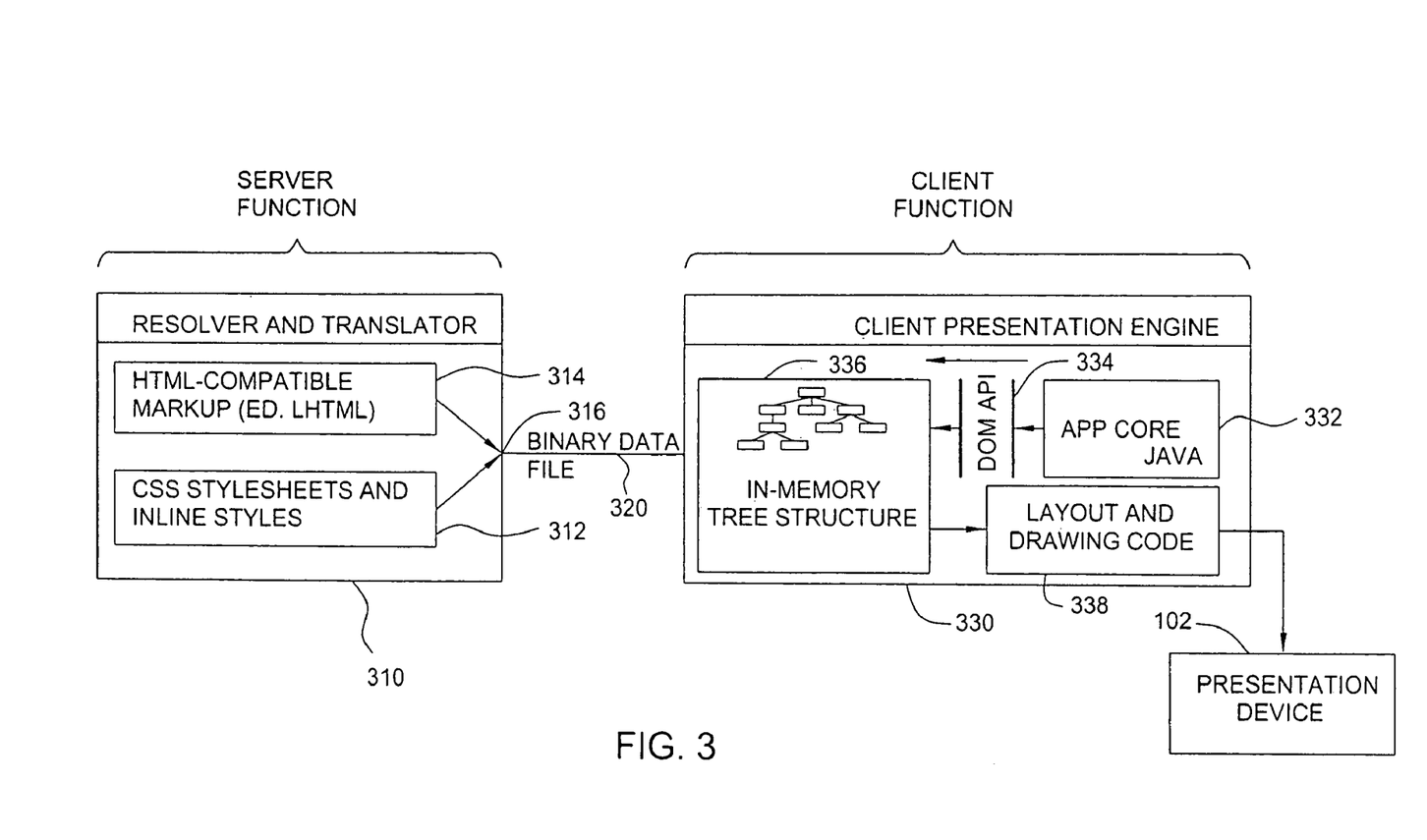
FIG. 3 depicts a high-level functional diagram useful in understanding the present invention.

FIG. 3 depicts a high-level functional diagram useful in understanding the present invention. Specifically, FIG. 3 depicts a server function; namely, a resolver and translator 310 that processes a mark-up file such as XML, XHTML and the like, as well as any CSS style sheets or in-line styles 312 to produce a binary file 320. The mark-up file 314 is processed to identify all presentation codes such as styles which, along with the in-line styles and CSS style sheet styles are resolved to a subset of style tags. The file and resolved style information are then compressed 316 into a binary data file 320 which is provided to a client presentation engine 330. The client presentation engine utilizes a Java application core 332, which works in conjunction with a DOM API 334 to process an in memory tree structure 336 provided by the compressed presentation-related code within the binary data file 320 such that layout and drawing code 338 may render and otherwise present application imagery on a presentation device 102.

The server function (i.e., the resolver, translator and compression function) may be implemented on a near side server 108 to produce a binary data file 320 for propagation via the network 106 to the client presentation engine 330, which is executed by the client or STB 104. These functions will be discussed in more detail below with respect to the figures and the tables included herein. The functions may be implemented as a method by one or more processors. The functions may be embodied as software instructions within a signal bearing medium or a computer product.

Figure 4:
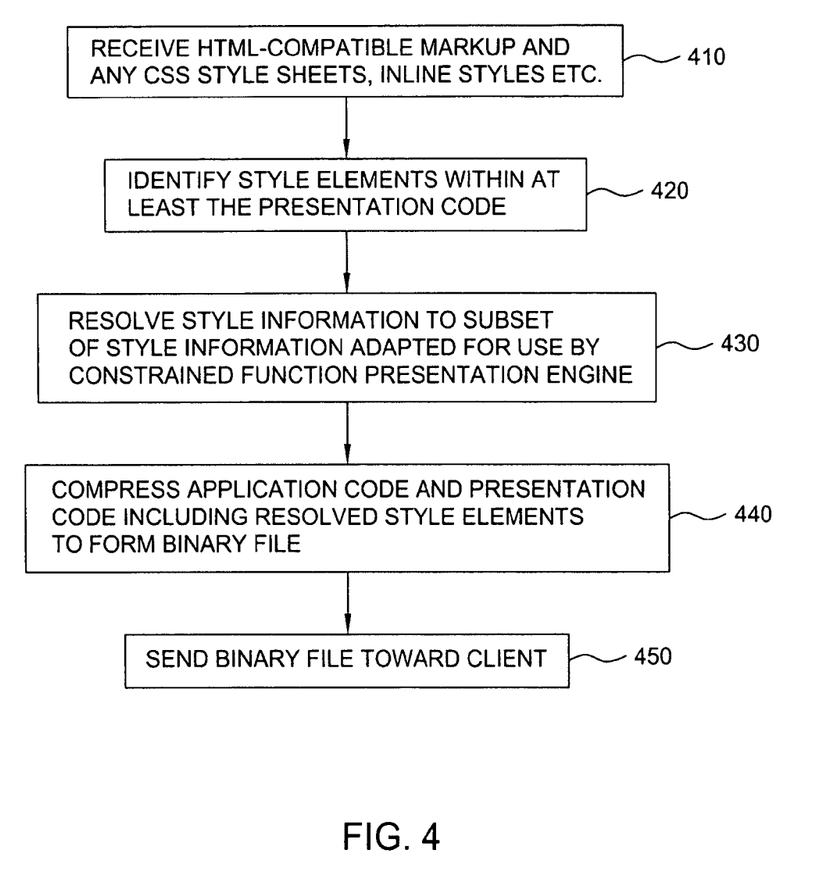
FIG. 4 depicts a flow diagram of a method according to an embodiment of the present invention.

FIG. 4 depicts a flow diagram of a method according to an embodiment of the present invention. Specifically, the method 400 of FIG. 4 describes processing (preprocessing with respect to the client) functions occurring within, illustratively, the near side server 108 of FIG. 1 in which XML, HTML, XHTML or other application code is processed to provide a compressed binary file adapted for use with a presentation engine of a resource-constrained client (i.e., a compact or constrained function presentation engine). The compressed binary file provided to a client after processing by the near or far side server comprises an error free syntactically correct binary code representation of the processed application code. As such, the compact presentation engine and, generally, the code parser and other functions operating within the client may avoid expending memory and computational resources on error correction, error detection and other processes. Thus, the memory and computational burden imposed upon the client is reduced by preprocessing application and associated presentation code, compressing the resulting preprocessed code and insuring that the compressed and preprocessed code provided to the client is syntactically correct such that error processing overhead may be avoided.

The method 400 operates to perform various processing functions normally performed by a client device such that the client device may substantially immediately display visual elements or process visual elements in a manner avoiding complexity normally required of a full featured presentation engine. In general, the method 400 of FIG. 4 removes code associated with presentation functions not invoked by the application, as well as streamlines invoked presentation functions by replacing identified unresolved style elements (which may be members of a large class of style elements) with a relatively small number of resolved style elements, such that a subset of the nominal class of style elements is used. In this manner, a reduced function presentation engine or compact presentation engine using only the reduced subset of resolved style elements may display the imagery normally associated with the full set of unresolved style elements. It is noted that style functions not related to the necessary resolved styles are optionally deleted from the presentation code to further reduce the size of the code.

The method is entered at step 410, when the server (e.g., the near-side server 108) receives an HTML-compatible mark-up file, any CSS style sheets, any in-line styles and the like. Generally, at step 410, the server receives mark-up code such as XML code or XHTML code representing an application intended for execution on a client device. The application includes application code and presentation code, where the presentation code includes various style elements used to provide a visually rich presentation of the application and its related imagery.

At step 420, the style elements within the presentation code and, optionally, the application code are identified. At step 430, the input style information is processed to provide a subset of style information adapted for use by a constrained function or a compact presentation engine. That is, at step 430 the method operates to perform at least one of the functions of simplifying or reducing the style information such as reducing the number of style properties, deleting style rules, simplifying style dependencies and compressing common resolved styles. It is noted that compressing common resolved styles may be performed as an additional step in said method after, for example, all the style information is resolved.

At step 440, the presentation code and, optionally, the application code including resolved style elements is compressed to form a binary file. At step 450, the binary file is transmitted or propagated toward the client via, for example, the network 106. As previously noted, the binary file comprises compressed application code and presentation code in which style elements have been dramatically simplified by utilizing a resolved subset of the style tags normally available. In addition, the binary file is generated in a manner avoiding syntactical errors such that the error processing burden on the client is reduced or eliminated. That is, a validation step is performed to ensure that errors are substantially eliminated in the binary file such that a non-validating parser may be used by the client.

Figure 5:
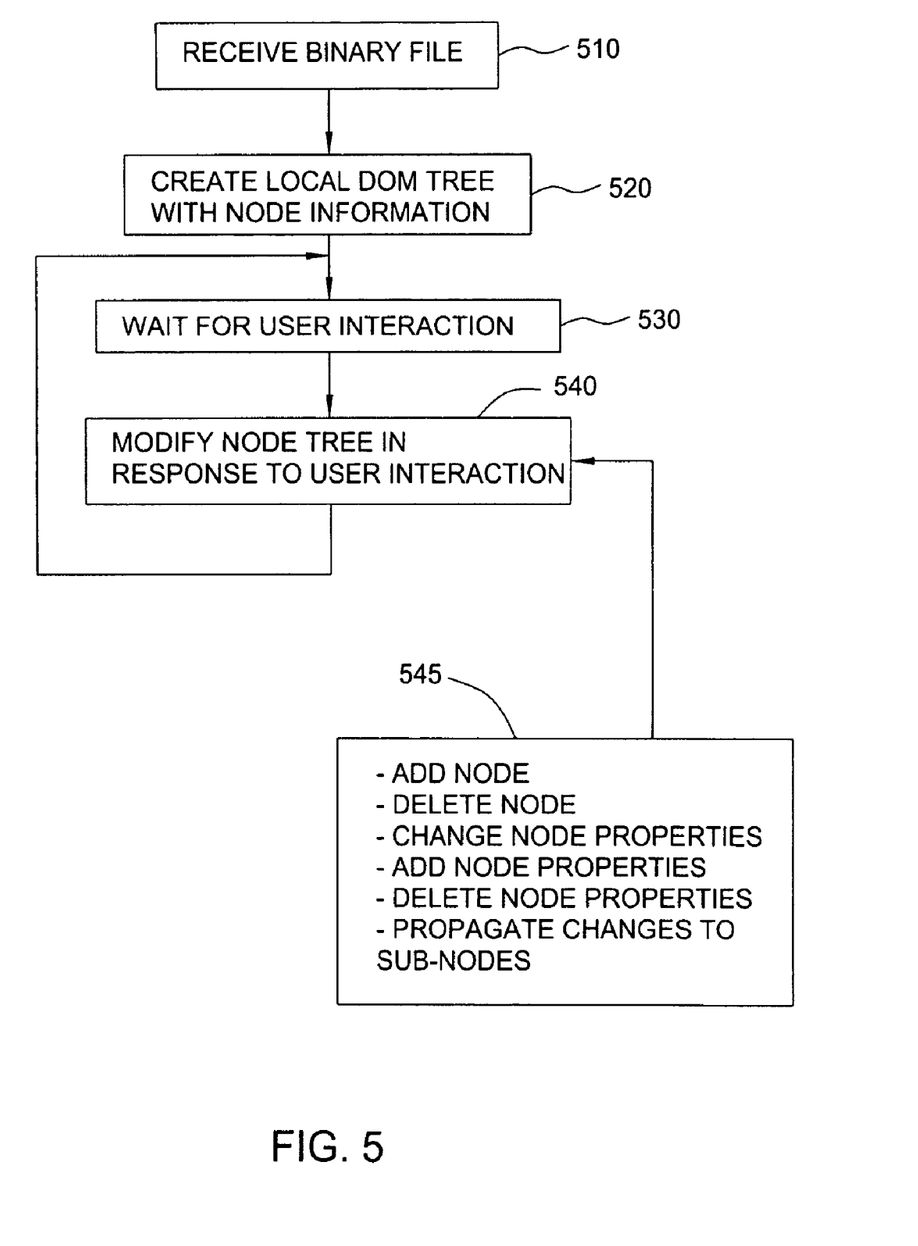
FIG. 5 depicts a flow diagram of a method according to an embodiment of the present invention.

FIG. 5 depicts a flow diagram of a method according to an embodiment of the present invention. Specifically, the method 500 of FIG. 5 describes processing functions occurring within, illustratively, the client 104 of FIG. 1 in which the client processes a binary file such as, for example, the binary file discussed above with respect to FIG. 4.

The method is entered at step 510, when the client receives a compressed binary file from, for example, the near side server 108. At step 520, a local Document Object Model (DOM) tree of nodes is created in response to a received binary file. For example, in one embodiment of the invention, a non-validating parser is used to process the received binary file which, as discussed above, comprises a substantially error-free file. The node information is extracted from the binary file and used to generate the tree of nodes representation of the presentation code. It is noted that the style information is resolved so that each node contains all of the information necessary to display itself (i.e., height, width, X position, Y position, font, color and the like). New styles have been created which are complete and resolved styles which are not necessarily related to the original styles. The nodes using the new style information have references to the new style. The information associated with each node includes source information defining where each of the properties associated with the node come from (i.e., whether from an inherited style or manually set on just that node), and if the properties are from an inherited style where that style comes from (i.e., a new resolved style or an existing style such as a style already stored on the client).

At step 530, the method waits for user interaction and, at step 540, the node tree is modified in response to received user interaction. Referring to box 545, the user interaction may comprise adding a node, deleting a node, changing the properties of a node, adding to the properties of a node, deleting properties from the node, and propagating changes in node properties to the sub-nodes associated with the node being manipulated.

In one embodiment of the invention, multiple style sheets on a server are referenced by one XML file on the server. In this embodiment, at least one of multiple stream resolutions on a set top box and multiple color pallets on the set top box are supported. The client code (e.g., JAVA or other code executed within the client) queries the set top box to determine the capabilities of the STB or other parameters associated with the STB to determine thereby which of the multiple style sheets are appropriate for the XML file to request from the server. The server then resolves the proper combination of XML/CSS files and delivers the preprocessed XML/CSS files within the context of a compressed binary file including presentation information optimized for the particular set top box. Thus, in response to a control signal, stored indicium or other representation of a capability level of the set top box or client, the server adapts the style resolving process to support the capability level of the set top box.

In one embodiment of the invention, the server does not need to have a complete font metric table, since the client determines how fonts are actually laid out in a requested font which is specified to each set top box. Advantageously, an absolute draw list providing the exact XY coordinate information of fonts is not created. Thus, a source of errors is eliminated and the creation of content is greatly facilitated. Similarly, the server does not need to know the display device resolution nor the actual size of images that will be propagated to the client, since such processing is performed on the client.

In one embodiment, the client is able to display the screen rapidly since the client keeps information pertaining to the effects of changes to any portion of the screen, including such information as a minimum amount or area required to repaint the screen portion. Thus, since the styles have been pre-resolved by the server, the repainting process invoked at the client is much faster for each node, since the information to accomplish this task is readily available to the client. Additionally, rectangles will be properly clipped by the parent and/or the screen which makes the processing at the client even faster. The client tracks which objects are displayed on top of other objects (i.e., at a higher screen layer or display layer), as well as which objects contain transparent bits so that a minimum amount of objects are repainted by the client.

Several examples of systems, data structures and general applicability of the invention will now be discussed with respect to server functionality and client functionality. In general, text-based files or streams including application and presentation code are processed by a server to produce a compressed binary code for use by a client device or set top box, as discussed above. The following examples will provide additional detail of different embodiments of the invention in which some or all of the listed tags and style properties may be used in different embodiments. It will be appreciated by those skilled in the art that more or fewer tags and other structures may be used without diverging from the fundamental aspects of the invention, and that such use of more or fewer style tags, style properties, functions and the like are contemplated by the inventors.

The application files or streams processed according to an embodiment of the present invention comprise a combination of tag-based mark-up and style information, either in-lined (i.e., within the application code or presentation code) or in separate style sheets. In one embodiment, the formatting of these input files are such that they are compatible with a standard HTML/CSS system.

The input files are processed by a server to produce a binary-encoded file including all the necessary application and presentation information using a small subset of the style tags normally available. In one embodiment, the input file is preprocessed at the server to transform the file into a format suitable for directly reading into client memory for display and manipulation. The input-side tool (i.e., the transcoder at the server) reads in the relevant mark-up file together with any stylesheets it references, resolves all of the styles, and then emits a serialized binary representation of the resulting tree structure to a file that can be loaded by the presentation engine. The data is optionally subjected to version control processing so that new style properties can be added to the system at a later date without trouble.

In one embodiment, the core style tags used by the transcoder are presented below as Table 1:

TABLE 1

| Tag name | Function |
|----------|----------|
| html | Main page container |
| body | Main page block |
| div | Styled element |
| span | Styled text-level element |
| img | Styled image |
| br | Line break |

These tags together are sufficient to allow specification of a wide variety of content. Effectively all presentational information would come from the styles of these elements. Style specification (style=attribute) would be mandatory for every element that doesn't want the simple, default style. An example of style parameters that could be supported are shown below in Table 2.

In various embodiments, support for other HTML-like inputs is provided. For example, a "bold" tag may be provided which is translated by the compact presentation engine as a styled span.

A position example will now be described. Assume that a content developer wanted to use the presentation engine to put an image somewhere towards the top left of the screen and a container of text with a 3D red border further down, they could do so with a file of the form:

<html><body>
<img src="myimage.vq" style="position:absolute;
top: 100px; left: 100px;"/>
<div style="border:2px outset red; position:absolute;
top: 220px; left: 100px; width: 400px; height: 30px;">
  This is some text!
</div></body></html>

This file is translated into a document tree containing an HTML element, underneath it a BODY element, underneath it an IMG and DIV element, and underneath the DIV element a text element. The HTML, BODY and DIV elements all map to visible elements or objects on the screen, and the text is flowed inside the innermost DIV element by the presentation engine.

The set of tags above looks deceptively simple. However, using the available styles for these elements, one can create a very rich set of graphical effects to allow fully automatic drawing and re-layout of complex screen presentations. An exemplary set of supported properties is shown below in Table 2:

TABLE 2

| CSS style property | What the property allows |
|--------------------|--------------------------|
| display | Settable to few specific values., either block for div, in-line for span, or "none" to turn off sections of the document. |
| Position | For images and (DIV) elements, declaring this "absolute" lifts block out of flow and instead places them at a specified location on the screen relative to their parent using (top, left, width, height) below. |
| Top, left, width, height | Location of element on screen, nested within parent. |
| Border (top, bottom, left, right, color, width, style) | Drawing of solid, inset, outset, beveled, dashed, etc. borders for the outside edges of diplayable objectss. |
| Border-radius | Radius of edges on borders to supported rounded rectangles or "wieners/capsules/lozenges" |
| Background | Background image for an element |
| Background-repeat | Specifies how the background image of an element is tiled. |
| Background-color | Solid color background for an element |
| Background-gradient | Sets a gradient as the background for an element |

TABLE 2-continued

| CSS style property | What the property allows |
| --- | --- |
| Font-family, font-size, font-style, font-weight, font-stretch | Specification of the font used to lay out and draw child text. |
| Margin | Specification of an element's margins (space around the outside edge of the border) |
| Padding | Specification of box padding (space between inside of border and content) |
| Text-align | Controls left/right/center/justification of text. |
| Vertical-align | Controls vertical alignment of objects within the line. |
| Color | Specifies text colour |
| Text-shadow | Specifies style of a background shadow on text. |
| Text-transform | Allows forced upper, lower or capitalized casing of text. |
| Text-decoration | Adds underlines, overlines or lines through text. |
| Visibility | Allows pieces of the document to be switched on or off |
| z-index | Controls layering for displayable objects at the same level |
| Focusable | Defines whether or not a piece of text or block level element is focusable |
| Line-height | Allows forcing tall lines for extra line spacing |

These together allow specification of the vast majority of the requirements for typical interactive TV and enhanced TV applications. Those which aren't fully allowed can be implemented at the code level by drawing underneath or on top of presented content.

In yet another example, a TV Guide EPG-style "wiener" (i.e., a relatively thin, horizontally disposed, rounded corner graphical object) with centered text may be styled as an object as follows. In this manner, the whole "wiener," together with its text content, may be rendered automatically by the client platform, moved around, have its contents or presentation altered and the like:

```
Div {
    Position: absolute;
    Width: 200;
    Height: 20;
    Border: 2px solid red;
    Border-radius: 10px;
    Text-align: center;
    Background-gradient: "0,0:rgb(190, 10, 10); 0,20: rgb(220, 10, 10)";
}
```

Document and Display Manipulation

An application running on the system taking advantage of the compact presentation engine described herein derives from a base class with access to a new set of APIs to load data files from the carousel. As mentioned above, the data files would contain an initial styled document tree that can be loaded into memory, easily cached (since it will be very small, typically of the order of hundreds of bytes) and manipulated by a set of Java APIs. The Java APIs allow manipulation of both the document structure (the elements that make up the tree) as well as the presentation of the elements (the styles, as listed above). Changing the document structure may mean removing, inserting or re-parenting elements; and changing the presentation could mean animating elements, altering their border, colour, text or image content. These two sets of APIs together allow creation of interesting dynamic content.

Exemplary tree manipulation APIs are as follows, currently expressed in IDL (Interface Definition Language) form:

```
interface Window extends lbrt.applet.Window
{
// Used to load document into window
    permanent attribute untyped location;
    jstatic Window getWindowForApplet(in Applet applet);
    permanent readonly attribute Document document;
}
interface Node {
    readonly attribute unsigned short    nodeType;
    readonly attribute Node    parentNode;
    readonly attribute Node    firstChild;
    readonly attribute Node    lastChild;
    readonly attribute Node    previousSibling;
    readonly attribute Node    nextSibling;
    readonly attribute Document    ownerDocument;
    Node insertBefore(in Node newChild, in Node refChild)
        raises(DOMException);
    Node replaceChild(in Node newChild, in Node oldChild)
        raises(DOMException);
    Node removeChild(in Node oldChild) raises(DOMException);
    Node appendChild(in Node newChild) raises(DOMException);
    boolean    hasChildNodes( );
}
interface Document : Node {
    Element createElement(in DOMString tagName) raises
        (DOMException);
    Text createTextNode(in DOMString data);
}
interface HTMLDocument: Document {
    Element getElementById(in DOMString elementId);
}
interface Element : Node {
    readonly attribute DOMString    tagName;
    readonly attribute CSSStyleDeclaration style;
    readonly attribute long    offsetTop;
    readonly attribute long    offsetLeft;
    readonly attribute long    offsetWidth;
    readonly attribute long    offsetHeight;
    readonly attribute long    offsetNode;
    DOMString getAttribute(in DOMString name);
    void setAttribute(in DOMString name, in DOMString value)
        raises(DOMException);
    void removeAttribute(in DOMString name)
        raises(DOMException);
    noenumerate attribute handler    onblur;
    noenumerate attribute handler    onfocus;
    noenumerate attribute handler    onmousedown;
    noenumerate attribute handler    onmouseup;
    noenumerate attribute handler    onmouseover;
    noenumerate attribute handler    onmouseout;
    noenumerate attribute handler    onclick;
}
```

The functions above provide for substantially full manipulation of the document tree—insertion and removal of elements, text, attachment of handlers (see below), query of laid-out-positions and basic tree traversal/element search. For modifying the presentation of the document, rather than its structure, the styles of individual elements would need to be changed. The object that facilitates this is the CSSStyleDeclaration, which is as follows:

```
interface CSSStyleDeclaration {
    void        setTrajectory(in DOMString propertyName,
                     in DOMString initial,
                     in DOMString values);
    void        clearTrajectory(in DOMString propertyName);
    attribute DOMString background;
    attribute DOMString backgroundAttachment;
    attribute DOMString backgroundColor;
    attribute DOMString backgroundImage;
    attribute DOMString backgroundPosition;
    attribute DOMString backgroundPositionX;
    attribute DOMString backgroundPositionY;
    attribute DOMString backgroundRepeat;
    attribute DOMString border;
    attribute DOMString borderBackground;
    attribute DOMString borderBottom;
    attribute DOMString borderBottomColor;
    attribute DOMString borderBottomStyle;
    attribute DOMString borderBottomWidth;
    ...etc... For each of the declared style properties above.
}
```

The above consists of a large, exemplary number of set/get methods that provide for getting or setting each individual CSS style property specifiable (see table of "CSS Style Properties" above). The setTrajectory/getTrajectory methods allow automated animation of individual properties by the platform, with either point-to-point, linear or quadratic interpolation.

Handlers

In one embodiment, areas of the screen (or elements or individual words of text or images) are focusable, and focus management can be optionally managed by the underlying presentation engine. In such an embodiment, these areas of the screen need a way to notify the Java-application when the highlight moves on or-off areas of the screen. Similarly, the application needs to be able to capture key requests, and ideally needs to be able to draw custom graphics in addition to the primitives supported by the presentation engine (in case, for example, it wants to draw odd arcs, angled lines and other shapes that the engine does not natively support). To do this, per-element handlers can be supported, as follows:

| Handler name | Explanation |
| --- | --- |
| Onclick | Invoked when a highlightable area is selected by pressing OK on the remote |
| Onmouseover | Invoked when focus moves over a given area |
| Onmouseout | Invoked when focus leaves a given area |
| Onredraw | Invoked before the presentation engine's content is drawn into the displayable object |
| Onnavigate | Invoked when the decision is being made to choose the next focusable target on screen, to block movement or alter behaviour. |

Classes that want to handle events from the system can implement a callback on individual elements. For example, Element.setOnClick(mylistenerclass) would set up a handler on an element such that, when the OK button is selected on the remote control, the relevant function (mylistenerclass) would be invoked. A similar handler can be set up that takes a graphics context as an argument to allow individual elements' contents to be drawn by Java code.

Re-Layout and Output

The layout engine supports incremental re-layout of the document. Each element in the document tree optionally contains a bitfield that indicates, if the element is "dirty" (i.e. if attributes of the element have been modified such that the element needs to be redrawn), what work is required to clean it up (i.e. what to draw). For example, for changes that require little work to changes that require a lot of work, valid actions may be to just re-expose the element (e.g., a color change), reposition the element (for a change to on-screen location), or re-layout the contents of the element (for a change to document-text or in-line image). Another bit is optionally used to leave a bit trail to the containing document object so that, when time comes to re-expose and re-layout, the dirty elements can be found easily. Then, the layout engine can perform the required changes and put together a "dirty" region for the screen as well as a list of move commands to be executed.

Rendering of the document tree uses a region system. This is one important aspect of making an efficient display system. The region holds a list of rectangles which is guaranteed to be the minimum number of rectangles required to express (optionally disjoint) areas of the screen. Different regions can be translated, unioned, intersected etc. in order to aid implementing the display code. All drawing to the screen is clipped against regions.

Exposure of the node tree optionally uses a hybrid back-to-front-to-back approach to factor out unnecessary redraws of underlying elements while still correctly handling transparency. The code paths to perform this work will be significantly simpler since, due to our pre-processing steps, we neither have to take into account nodes that aren't clipped by their parent (a feature of the full, unresolved HTML/CSS language) nor scrollable areas.

Client Embodiment

In one embodiment, the constrained function or thin client presentation engine uses a defined framework which is divided into two components. The first half is a simple input side, which consists of a bare-bones canonical non-validating XML parser. The second half is a combined layout/render engine, using techniques providing for high performance drawing, clipping and page layout functions.

For creating content user interfaces, a forward HTML/CSS-compatible XML DTD (Document Type Definition) is used to specify a tiny subset of tags and attributes that will be read in to create a document structure. This parser may be exported directly to applications so that the applications may make use of the parser functionality. This function is described above with respect to FIGS. 2–4.

The second stage is a tiny layout engine, which allows flowing lines and images as well as manipulation of X/Y positioned content. This engine takes the document structure and emits a set of display objects on the screen together with positional information for text, images, borders and other graphical elements contained within the display objects or nodes. In this environment, the actual memory occupied by the parsed document and corresponding display objects may well be the same or different. It is noted that imagery to be displayed is represented by a signal propagated toward the display device.

The final stage is the drawing environment, which provides high performance rendering of the node tree, far exceeding that currently possible from Java. The node tree is created by the internal layout system, but each node in the tree can also allow Java handlers to be registered allowing Java to draw within them too.

The document structure, and thus nodes, can be dynamically updated and altered using forward-compatible DOM APIs. This allows alteration of any part of the document structure, as well as addition and removal of new components.

The input side of the client system uses an XML parser. In one embodiment, the parser uses the SAX API. In one embodiment, the parser uses little or no error correction. Such a parser requires around 1 KB of memory and parses only correct XML, offering extremely high performance. The parser consists primarily of calls to a "sink" to store off tags, attribute/value tables and text.

The API of the parser is, optionally, exported to C code (for use by a document presentation engine) and Java, so that other applications can use it to decode data feeds in standard formats. In one embodiment, a standard client is provided where the parser is exposed to JavaScript also (via IDL).

Document Manipulation

The functions discussed above allow the document to be read from an XML input, laid out and presented. However, in a dynamic system embodiment, a subset of DOM methods is supported for altering the document structure such that changes appear on the screen accordingly. The related methods allow addition and removal of elements in the document tree, replacement of text and images, and controlling the presentational aspects of existing elements by manipulating style properties—the on-screen position, size, borders, z-index, fonts, colours and all other things that control how things look. Optionally implemented is a "setTrajectory" API which allows automated animation of any of these properties (along point-to-point, linear or curved paths) to achieve efficient animation of position, colours or any other parameters without the Java interpreter needing to be invoked on each frame.

A node or object framework is also provided, which logically sits alongside AWT (the Java Abstract Window Toolkit), an alternative the content developer may use if she/he makes use of the presentation engine.

The node or object framework supports, for example, a tree of nested rectangular, optionally transparent nodes, each of which conforms to the CSS box model (this means each node has a margin area around the outside, optional borders, and then optional empty padding space between the borders and content of the node or display object). Each node will have a specified background color or background image or, if no background is specified, will be assumed to be transparent. Each node clips its child nodes and its content.

The node or displayable object code optionally uses a hybrid exclusion-back-to-front drawing model. This guarantees that, for any required exposure, the minimum amount of actual drawing will be performed, but containers that are transparent (in whole or in part) will still be drawn correctly. It also makes use of a simplified form of the existing region code for minimizing redraw of disjoint areas of the screen.

The code optionally makes use of an accelerated move feature which is intelligent enough to avoid large repaints when nodes on the screen move, instead opting for a blit-partial-repaint strategy, even when things are on top of the node. This approach allows maximum efficiency on-screen animation by avoiding unnecessary drawing when moving objects, but still correctly copes with transparency.

While the foregoing is directed to certain embodiments of the present invention, these embodiments are meant to be illustrative, not limiting. Other and further embodiments of the invention may be devised without departing from the basic scope thereof, and the scope thereof is determined by the claims that follow.

We claim:

1. A method of propagating presentation code to a client said client using a constrained function presentation engine, said method comprising:
    identifying style information within said presentation code at a server;
    resolving, at said server said style information to a subset of said style information;
    compressing, at the server said presentation code including said subset of said style information to provide a binary-encoded file for use by said constrained function presentation engine, said subset of said style information represented within said binary-encoded file;
    validating said binary-encoded file to provide an error-free binary-encoded file at the server;
    propagating said error-free binary-encoded file toward said client;
    translating said error-free binary-encoded file into a document tree containing a plurality of nodes at said client, wherein said translating includes non-validating parsing to avoid expending memory and computational resources on error correction and error detection at said client, wherein each one of said plurality of nodes represents said subset of said style information, wherein each one of said plurality of nodes comprises at least one user manipulable property; and
    modifying at least one of said plurality of nodes in response to a received user interaction with the document tree at said client;
    wherein said resolving said style information comprises two or more of: reducing the number of style properties, deleting style rules, and simplifying style dependencies in said style information.

2. The method of claim 1, wherein said presentation code is substantially compliant with an HTML/CSS system.

3. The method of claim 2, wherein said presentation code comprises at least one of in-line XML styles and CSS style sheets.

4. The method of claim 1, further comprising adapting the style resolving process in response to an indicium of capability of a client.

5. The method of claim 4, wherein said indicium comprises a control signal received from the client.

6. The method of claim 1, wherein said presentation code comprises a markup file and associated CSS style sheets.

7. The method of claim 1, further comprising compressing common resolved styles.

* * * * *